United States Patent [19]

Keith

[11] Patent Number: 4,965,752

[45] Date of Patent: Oct. 23, 1990

[54] SPATIAL TRANSFORMATION OF NODE POINTS IN COMPUTER GRAPHICS USING VECTOR DIFFERENCES BETWEEN THEIR SPATIAL COORDINATES

[75] Inventor: Michael Keith, Bucks County, Pa.

[73] Assignee: Intel Corporation, Santa Clara, Calif.

[21] Appl. No.: 41,942

[22] Filed: Apr. 24, 1987

[51] Int. Cl.$^5$ ............................................. G06K 9/32
[52] U.S. Cl. ................................... 364/522; 364/521; 382/44; 340/723
[58] Field of Search ............... 364/518, 519, 521, 523, 364/522; 382/44–46; 340/720, 723, 727; 358/11, 21, 22

[56] References Cited

U.S. PATENT DOCUMENTS

| | | | |
|---|---|---|---|
| 4,152,766 | 5/1979 | Osofsky et al. | 364/515 |
| 4,381,547 | 4/1983 | Ejirt | 382/47 |
| 4,468,688 | 8/1984 | Gabriel et al. | 382/46 X |
| 4,631,750 | 12/1986 | Gabriel et al. | 382/44 X |
| 4,654,651 | 3/1987 | Kishi et al. | 340/731 |
| 4,672,680 | 6/1987 | Middleton | 382/46 X |
| 4,712,185 | 12/1987 | Aoki | 364/518 |
| 4,736,442 | 4/1988 | Kornfield | 340/723 X |

Primary Examiner—Gary V. Harkcom
Assistant Examiner—H. R. Herndon
Attorney, Agent, or Firm—Carl L. Silverman; William H. Murray; Francis M. Linguiti

[57] ABSTRACT

A method for computing, in a computer with a television terminal, spatially transformed locations for samples in three-dimensional image space, of which a two-dimensional view is afforded on the television terminal. The spatial transformation of sample locations allows objects to be rotated, precessed or translated on the viewing screen of the television terminal. The original locations of samples are considered to be along a path in image space proceeding from a starting point sample. A spatial transform of the starting point is computed. The successive vector differences between successive samples along the path are determined, and the various values of these vector differences are spatially transformed. Spatially transformed samples are successively generated along the spatially transformed path in image space by successively adding the spatially transformed vector differences to the spatially transformed starting point sample, in an accumulation procedure. Where the number of various values of vector differences is substantially smaller than the number of vector differences, the method is more efficient than spatially transforming the locations of samples individually, the measure of efficiency being the number of digital multiplications required for the number of sample locations spatially transformed.

5 Claims, 2 Drawing Sheets

SPATIAL TRANSFORMATION OF NODE POINTS IN COMPUTER GRAPHICS USING VECTOR DIFFERENCES BETWEEN THEIR SPATIAL COORDINATES

The present invention relates to computer-generated graphics for presenting views of three-dimensional objects on the display screen of a television terminal.

BACKGROUND OF THE INVENTION

A popular form of computer graphics is the so-called "wire-frame model" type. Any curved surfaces of three-dimensional objects are approximated by a plurality of flat surfaces. Then all surface boundaries that are not straight-line in nature are approximated by straight lines. The end points of the straight lines are designated "nodes", are assigned node numbers and are listed in memory according to their assigned numbers. Each listing in memory includes the spatial coordinates of the node and further includes descriptions of the topological relationship of that node to other nodes as identified by their assigned node numbers. The spatial coordinates are normally specified in terms of three-dimensional Cartesian coordinates x, y, and z. This listing in memory is considered to describe "graphics primitives." These primitives are basic geometric shapes and as here considered are polygons.

Rotation, precession and translation of three-dimensional objects as viewed on the display screen of the television terminal involves geometric processing of the stored memory listings, which is done in the central processing unit of the computer. The modified listings are then furnished to a drawing processor, which converts the listings to a full raster of image samples for storage in computer memory. This full raster of image samples is then supplied to a display processor that responds to these image samples to generate video signals for the television terminal. At the present state of the art the most advanced drawing and display processors use dedicated digital hardware to provide sufficient processing capability to convert the graphics primitives to video signals at rates which allow the simulation of fluid motion of objects on the display screen of the television terminal.

The geometric processing referred to above generally involves three basic steps. In the first of these steps the spatial coordinates of the nodes are spatially transformed—i.e., moved in image space corresponding to the rotation and translation of the object described by the graphics primitives. The second of these steps, which is sometimes omitted, is the recalculation of the transformed node coordinates to take into account perspective. The third step in geometric processing is clipping, where image data outside of the field of view of the display are discarded. With the more powerful drawing and display processors currently becoming available, the time involved in the spatial transformation of node spatial coordinates becomes the most limiting factor in obtaining high-rate fluid motion of objects on the display screen of the televison terminal. Accordingly, a faster method for performing the spatial transformation of each of these nodes is sought. The invention concerns the speeding up of the first basic step in geometric processing by reducing the number of digital multiplications involved.

The mathematics used for spatial transformation in the prior art can be simply described in the following matrix algebra equation.

$$P' = AP + T$$

Here, P is the 3×1 matrix descriptive of the x, y, z coordinates of the original position of a sample of the object surface in three-dimensional image space. A is the 3×3 matrix descriptive of the rotation and precession of the object in three-dimensional space, assuming A to be normalized. A may be the normalized A, however, with all coefficients multiplied by a scalar factor, which changes the size of the object, as well as arranging for its rotation, precession, or both rotation and precession. T is the 3×1 matrix descriptive of the translation, in image space, of the center of rotation and precession of the object. P' is the 3×1 matrix descriptive of the transformed position of the sample in image space.

The equivalent of the matrix equation in linear algebra are the three equations following.

$$x' = ax + by + cz + d$$

$$y' = ex + fy + gz + h$$

$$z' = jx + ky + lz + m$$

Here, a-c, e-g and j-l are the coefficients appearing in the A matrix; and d, h and m are the coefficients appearing in the T matrix. The original coordinates of the sample have values x, y, z and the spatially transformed coordinates of the sample have the values x', y', z'. There are nine digital multiplications (ax, by, cz, ex, fy, gz, jx, ky and lz) involved in the spatial transformation of a single sample and nine digital additions.

The inventor observes that typically many of the plane surfaces bounded by nodes in the wire frame model are parallelograms. Other surfaces with pairs of parallel, equal-length sides are also possible. When this is so, an alternative method of performing spatial transformations can be more efficient than the prior art method described above; and, when this is not so, this alternative method is no less efficient than the prior art method.

SUMMARY OF THE INVENTION

The invention is a method for computing, in a computer with a television terminal, spatially transformed locations for a plurality of samples with original locations along a path in three-dimensional image space. This method spatially transforms the location in image space of one of these samples, considered as a starting point along the path, which spatial transformation may be done in accordance with prior art technique. The successive vector differences of others of the plurality of samples from the starting sample as one proceeds along the path are determined, and the various values of these are spatially transformed. Then, the spatial transformed path between sample locations is followed by adding the spatial transforms of successive vector differences of each succeeding one of the samples along that path from its predecessor, to successively generate the spatial transformed locations in image space of each of the plurality of samples other than the one considered as a starting point.

The efficiency of this method reposes in the fact that the number of various values of the vector differences is usually substantially smaller than the number of samples to be spatially transformed. So the number of spatial transformations involving digital multiplication to effect rotation, precession, or both rotation and precession is accordingly reduced.

DETAILED DESCRIPTION

Figure 1:
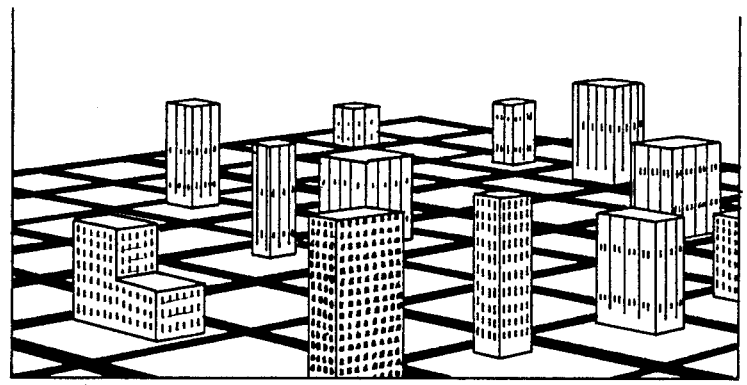
FIG. 1 is a perspective view of buildings on a gridwork of streets as might appear on a display screen.

The FIG. 1 display is generated for storage in bit-map organization in display memory using three-dimensional to two-dimensional transformation procedures known in the art, proceeding from wire-frame model listings in other image memory. Hidden surfaces of the polyhedra representative of buildings are suppressed in these transformation procedures. The gridwork of lines representative of the centers of streets are broadened to form streets in the three-dimensional to two-dimensional transformation procedures. The three-dimensional to two-dimensional transformation procedures include depth mapping in the z direction perpendicular to the x, y plane in which the display is considered to exist, so the eclipsing of streets by buildings and of some buildings by others can be calculated using depth as an indication of priority in the final display. Surface textures, such as building windows are mapped onto the exposed surfaces stored in the bit-map organization.

Figure 2:
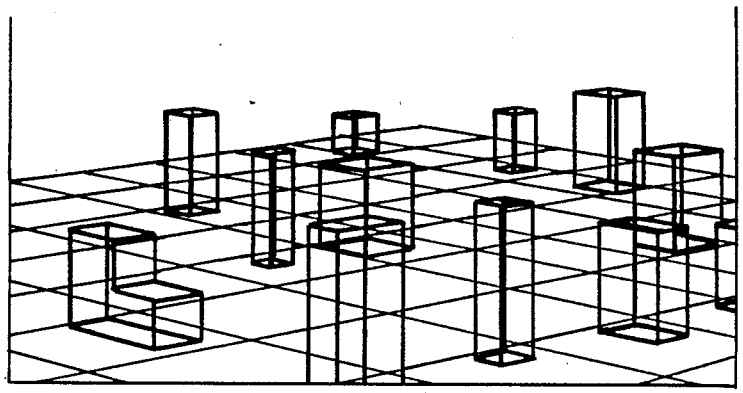
FIG. 2 is a perspective view of the wire-frame model for the FIG. 1 scene.

Looking at FIG. 2 and considering the hidden surfaces of the polyhedra representative of buildings, one will note the number of nodes or points where straight lines intersect to be 151 in number. Fifty-one of these nodes are associated with street intersections, and one hundred of these nodes are associated with corners of buildings. (There are eight nodes associated with each of the eleven parallelopiped buildings and twelve nodes associated with the building with the stepped roof.) If one used the prior art technique for spatial transformation, there would be a spatial transformation for each of the 151 nodes, each of which transformations would involve nine digital multiplications for a total of 1359 digital multiplications.

Suppose one considers the FIG. 2 wire-frame model in terms of difference vectors. For most practical purposes two oppositely directed vectors of like amplitude may be considered as being the same, with the difference between them being taken care of by a single bit to control whether or nor addition should be replaced by subtraction in vector arithmetic. Differences between vectors is so considered throughout this paragraph. Two different difference vectors suffice to describe the intersecting streets on the ground plane. Three different difference vectors suffice to describe the twelve straight-line edges of each parallelopiped building, which edges join at eight nodes. Seven different difference vectors suffice to describe the stepped building, the edges of which join at twelve nodes. With eleven parallelopiped buildings none of the same size and a stepped building, forty-two different values of difference vector obtain in the FIG. 2 wire-frame model. So only forty-two spatial transformations are required in addition to the spatial transformation for a starting point on the street grid and the spatial transformations of the starting points for each of the twelve buildings. These sixty-five spatial transformations involve nine digital multiplications each, for a total of 585 digital multiplications, when the method of the invention is used.

Where a set of N difference vectors of different amplitudes are parallel to each other, the number of digital multiplications involved in generating them can be reduced from 9n. One of the vectors is spatially transformed and the spatially transformed vector amplitude is scaled to generate the other spatially transformed vectors. This can be done because scaling factors between the amplitudes of parallel vectors are unaffected by spatial transformation. Each scaling of a vector involves three digital multiplications, one for each image space coordinate. So the total number of digital multiplications involved in scaling the n parallel vectors is $9+3n$, rather than $9n$.

Accumulation errors may occur in practicing the invention. The errors can be kept acceptably low by restricting the path lengths in regard to the number of difference vectors in them. Path lengths can be kept short by increasing the number of starting points that are spatially transformed using absolute spatial coordinates. But a better procedure, insofar as it is possible to employ it, is to use a common starting point for more than one path through successive samples. That is, to reduce cumulative computational error, a long path through successive samples from an end starting point can be replaced by two short paths through successive samples which radiate from a starting point centrally located on the long path. Still better, to the extent it is possible to employ it, is to use a common starting point with several short paths through successive samples radiating outwards from it.

In the illustration of the method of the invention as applied to the wire-frame model of FIG. 2, separate starting points were assumed for the street grid and for each of the buildings. One could alternatively arrange to describe the relationship of the buildings to the street grid using difference vectors. This would be efficient if the buildings had uniform setbacks from the street. One could then use one starting point for all the spatial transformations, or choose distributed starting points on other than a per building basis.

The building with stepped roof is particularly interesting with regard to the invention because its longer corner boundaries are in 2:1 ratio with its shorter corner boundaries. Where difference vectors are in integer ratio to each other or to a common submultiple, they may be divided into a concatenation of similar-size difference vectors. This creates further nodes in the wire-frame model, but the spatial transformations from each of these nodes to the next involves only additions and requires no further vector multiplication. The only vector multiplication involved in the transformation is that of the common measuring vector, which the plurality of difference vectors are each scaled from.

Figure 3:
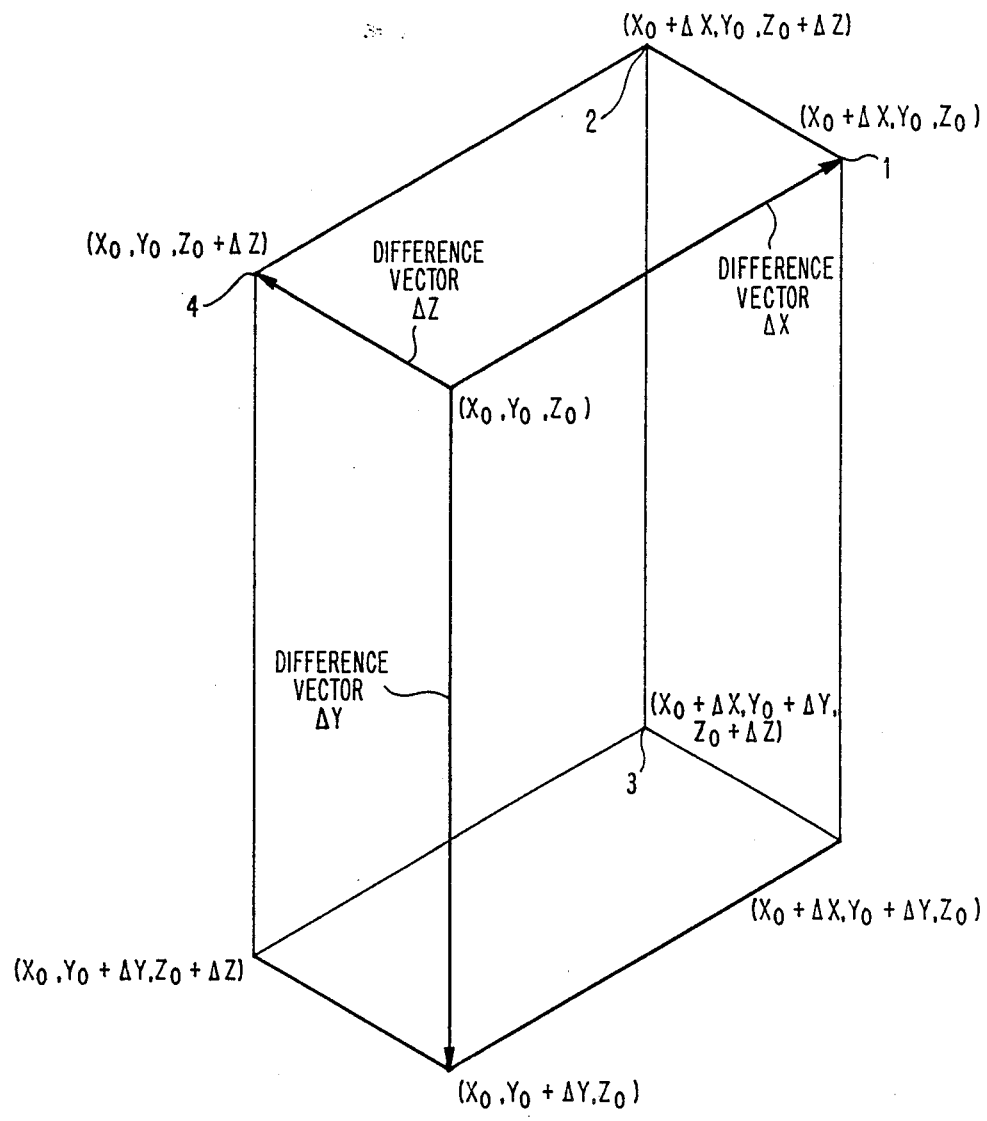
FIG. 3 is a perspective view of the wireframe model for one of the buildings of FIG. 1.

FIG. 3 may be referred to in considering more specifically how the method of the invention is used to spatially transform the eight corners of the wire frame model representative of one of the parallelopiped buildings in FIG. 1. Television axis coordinates are used, as shown at the bottom of FIG. 3. In the prior art the eight corner coordinates $(x_0, y_0, z_0)$, $(x_0+\Delta x, y_0, z_0)$, $(x_0+\Delta x, y_0, z_0+\Delta z)$, $(x, y_0, z_0+\Delta z)$, $(x_0, y_0+\Delta y, z_0)$, $(x_0+\Delta x, y_0+\Delta y, z_0)$, $(x_0+\Delta x, y_0+\Delta y, z_0+\Delta z)$ and $(x_0, y_0+\Delta y,$ $z_0+\Delta z$) would have to be separately transformed using the component spatial transform equations set forth in the background of the invention.

Using the present invention, the FIG. 3 structure is described in terms of a starting point ($X_0$, $Y_0$, $Z_0$) and three difference vectors $\Delta x$, $\Delta y$, $\Delta z$. The starting point is spatially transformed using the component spatial transform equations to yield:

(a $x_0$+b $y_0$+c $z_0$+d, e $x_0$+f $y_0$+g $z_0$+h, j $x_0$+k $y_0$+l $z_0$+m).

The $\Delta x$ vector is spatially transformed to yield:

(a $\Delta x$+d, e $\Delta x$+h, j $\Delta x$+m).

The $\Delta y$ vector is spatially transformed to yield:

(b $\Delta y$+d, f $\Delta y$+h, k $\Delta y$+m).

The $\Delta z$ vector is spatially transformed to yield:

(c $\Delta z$+d, g $\Delta z$+h, l $\Delta z$+m).

The spatial transforms for the seven corners other than $x_0$, $y_0$, $z_0$, are then generated by linearly combining these four spatial transforms.

Since $x_0+\Delta x$, $y_0$, $z_0$ equals $x_0$, $y_0$, $z_0$ starting point plus $\Delta x$ difference vector, the spatial transform of this corner equals the sum of the spatial transforms of $x_0$, $y_0$, $z_0$ and $\Delta x$ set forth above. The spatial transform of the corner at ($x_0+\Delta x$, $y_0$, $z+\Delta z$) can then be calculated by summing the spatial transforms of ($x_0+\Delta x$, $y_0$, $z_0$) and $\Delta z$. The spatial transform of the corner at ($x+\Delta x$, $y_0+\Delta y$, $z_0+\Delta z$) can then be calculated by summing the spatial transforms of ($x+\Delta x$, $y_0$, $z_0+\Delta z$) and $\Delta y$.

Following another path from starting point ($x_0$, $y_0$, $z_0$), the spatial transform of the corner at ($x_0$, $y_0$, $z_0+\Delta z$) can be calculated by summing the spatial transforms of ($x_0$, $y_0$, $z_0$) and $\Delta z$. This spatial transform added together with the spatial transform of $\Delta y$ generates the spatial transform of the corner at ($x_0$, $y_0+\Delta y$, $z_0+\Delta z$).

Following a third path from starting point ($x_0$, $y_0$, $z_0$) its spatial transform and that of $\Delta y$ are summed to generate the spatial transform of the corner at ($x_0$, $y_0+\Delta y$, $z_0$). This spatial transform, in turn, has the spatial transform of $\Delta x$ added to it to generate the spatial transform of the remaining corner at ($x_0+\Delta y$, $y_0+\Delta y$, $z_0$).

Note that difference vectors aligned with the principal coordinate axes are transformed with only three multiplications required, rather than nine. In such a case it is preferable that the original wire-frame coordinates are retained in the data base and all subsequent spatial transformations are performed proceeding from them, rather than that a sequence of spatial transformations are performed by chain calculations.

What is claimed is:

1. A method for moving an image having a plurality of television image samples with original locations along a path in a three-dimensional image space, said method comprising:
    determining a path through said image samples defined by difference vectors connecting successive samples along said path;
    spatially transforming the original location in said image space of one of said plurality of samples that is the starting sample along said path;
    spatially transforming said difference vectors;
    spatially transforming the location of samples along a path of locations by proceeding from the transformed location of the starting sample and sequentially performing a single vector addition of a single spatially transformed difference vector at each location, to successively generate the spatially transformed locations of each of the samples only by said single vector addition of said single spatially transformed difference vector; and
    moving the image from an original image location to a transformed image location in accordance with the spatially transformed locations.

2. The method of claim 1 wherein the transform of a difference vector which connects first and second samples in untransformed image space is added to the transform of the first sample to generate the spatially transformed location of the second sample.

3. The method of claim 1 further comprising the step of generating a wire-frame model by displaying samples and vectors connecting the displayed samples for generating a portion of the display presented on said television terminal in accordance with said spatially transformed locations.

4. The method of claim 1 further comprising the step of spatially transforming an original location of a starting sample for each of a plurality of sample paths.

5. The method of claim 4 wherein the paths of said plurality of sample paths have a common original location of starting samples.

* * * * *